US010609945B2

(12) United States Patent
Binia et al.

(10) Patent No.: US 10,609,945 B2
(45) Date of Patent: Apr. 7, 2020

(54) COMPOSITIONS COMPRISING 2FL AND LNNT TO CONTROL FOOD INTAKE AND GROWTH IN INFANTS OR YOUNG CHILDREN

(71) Applicant: NESTEC S.A., Vevey (CH)

(72) Inventors: Aristea Binia, Fribourg (CH); Jose Manuel Ramos Nieves, Lausanne (CH); Chiara Nembrini, Oron-la-Ville (CH); Norbert Sprenger, Savigny (CH); Laurent Favre, Servion (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 16/071,696

(22) PCT Filed: Jan. 26, 2017

(86) PCT No.: PCT/EP2017/051585
§ 371 (c)(1),
(2) Date: Jul. 20, 2018

(87) PCT Pub. No.: WO2017/129645
PCT Pub. Date: Aug. 3, 2017

(65) Prior Publication Data
US 2019/0029302 A1 Jan. 31, 2019

(30) Foreign Application Priority Data
Jan. 26, 2016 (EP) .................................... 16152741

(51) Int. Cl.
*A23L 33/125* (2016.01)
*A23L 33/00* (2016.01)
*A23L 33/105* (2016.01)

(52) U.S. Cl.
CPC ........... *A23L 33/125* (2016.08); *A23L 33/105* (2016.08); *A23L 33/40* (2016.08); *A23V 2002/00* (2013.01); *A23V 2200/3202* (2013.01); *A23V 2200/332* (2013.01); *A23V 2250/284* (2013.01)

(58) Field of Classification Search
CPC ....... A23L 33/125; A23L 33/105; A23L 33/40
See application file for complete search history.

(56) References Cited

U.S. PATENT DOCUMENTS

2014/0248415 A1\* 9/2014 Brassart .................... A23L 5/00
426/658

FOREIGN PATENT DOCUMENTS

| CL | 2018001825 A1 | 8/2018 |
|---|---|---|
| EP | 2510811 | 10/2012 |
| EP | 2745705 | 6/2014 |
| WO | 2009082214 | 7/2009 |
| WO | 2011108918 | 9/2011 |
| WO | 2013057049 | 4/2013 |
| WO | 2015071402 | 5/2015 |
| WO | 2015085557 | 6/2015 |

OTHER PUBLICATIONS

Alderete et al., Am. J. Clin. Nutr., 2015, 102, p. 1381-1388, First published online Oct. 28, 2015. (Year: 2015).\*
Disantis et al. "Do infants fed directly from the breast have improved appetite regulation and slower growth during early childhood compared with infants fed from a bottle?" International Journal of Behavioral Nutrition and Physical Activity, 2011, vol. 8, No. 89, 11 pages.
Casabiell et al. "Presence of leptin in colostrum and/or breast milk from lactating mothers: a potential role in the regulation of neonatal food intake" Journal of Clinical Endocrinology and Metabolism, 1997, vol. 82, No. 12, pp. 4270-4273, XP002759227.
Anderson et al. "Multifunctional roles of dietary proteins in the regulation of metabolism and food intake: application to feeding infants" J. Pediatr., 2006, vol. 1, No. 49, pp. S74-S79.
Chile Patent Office Communication for corresponding application No. 201801826, dated Jan. 9, 2020, 15 pages.

\* cited by examiner

*Primary Examiner* — Jonathan S Lau
(74) *Attorney, Agent, or Firm* — K&L Gates LLP (57) ABSTRACT

The present invention relates to a nutritional composition comprising at least one fucosylated oligosaccharide and at least one N-acetylated oligosaccharide, for use in reducing and/or controlling food intake in an infant or a young child, and/or for use in promoting a healthy growth in an infant or a young child.

15 Claims, 6 Drawing Sheets

COMPOSITIONS COMPRISING 2FL AND LNNT TO CONTROL FOOD INTAKE AND GROWTH IN INFANTS OR YOUNG CHILDREN

CROSS REFERENCE TO RELATED APPLICATIONS

The present application is a National Stage of International Application No. PCT/EP2017/051585, filed on Jan. 26, 2017, which claims priority to European Patent Application No. 16152741.1, filed on Jan. 26, 2016, the entire contents of which are being incorporated herein by reference.

FIELD OF THE INVENTION

This invention relates to nutritional compositions comprising specific oligosaccharides for use in reducing and/or controlling food intake in an infant or a young child, and/or for use in promoting a healthy growth in an infant or a young child.

BACKGROUND OF THE INVENTION

Mother's milk is recommended for all infants for various reasons. It has been especially widely reported that breast fed infants do have a different growth pattern than infants fed with infant formula. Indeed, breast fed infants have a lower weight gain and a lower body fat mass within the first year of life as compared to infants fed with infant formula. Additionally, breast fed infants have a different gut microbiota profile as compared to infant fed with infant formula. Altogether, these factors affect the development of the infant physiology, including metabolism, immunity and overall growth.

It has also been reported that feeding patterns of infants and young children—such as the frequency and the amount of ingested food that may depend on their satiety responsiveness—vary depending on the type of milk consumed but also on the mode of milk delivery. A previous study has reported that from the 6th week of life onwards, formula fed infants had significantly higher feeding volumes than breast-fed ones (Sievers et al, "*Feeding patterns in breast-fed and formula-fed infants*", 2002). Another study has shown that children who were breastfed during the first year show increased satiety responsiveness during the second year compared to those who were formula fed (A Brown et al, "*Breastfeeding during the first year promotes satiety responsiveness in children aged 18-24 months*", 2012). These studies suggest that breast milk might contain some factors inducing satiety. In addition infants who are bottle-fed in early infancy are more likely to empty the bottle or cup in late infancy than those who are fed directly at the breast (Li et al, "*Do Infants Fed From Bottles Lack Self-regulation of Milk Intake Compared With Directly Breastfed Infants?*", 2010).

However, in some cases breastfeeding is inadequate or unsuccessful for medical reasons or the mother chooses not to breast feed. Infant formula have been developed for these situations. Fortifiers have also been developed to enrich mother's milk or infant formula with specific ingredients.

Short Chain fatty acids (SCFAs) are especially produced by microbial fermentation of dietary fibres in the colon. Propionate is a SCFA that has been shown to be involved in the regulation of food intake and to enhance satiety (Arora et al., "*Propionate. Anti-obesity and satiety enhancing factor?*", 2011; Lin et al., "*Butyrate and Propionate Protect against Diet-Induced Obesity and Regulate Gut Hormones via Free Fatty Acid Receptor 3-Independent Mechanisms*", 2012; Chambers et al, "*Effects of targeted delivery of propionate to the human colon on appetite regulation, body weight maintenance and adiposity in overweight adults*", 2014; Canfora et al, "*Short-chain fatty acids in control of body weight and insulin sensitivity*", Nat Rev. Endocrinol. 11, 577-591, 2015).

Increasing colonic propionate is therefore an attractive target for appetite modulation and weight management. However, orally administered SCFA are unpalatable and are rapidly absorbed in the small intestine. Specific delivery systems targeting the release of propionate in the proximal colon have therefore been developed for some studies. In Chambers et al, "*Effects of targeted delivery of propionate to the human colon on appetite regulation, body weight maintenance and adiposity in overweight adults*", 2014, scientists have developed a particular carrier molecule whereby propionate is chemically bound by an ester bond to inulin, a natural polymer composed mainly of fructose. This inulin-propionate ester was chemically synthesised. The majority of propionate chemically bound to inulin should only be released when the inulin polymer is fermented by the colonic microbiota, thus providing targeted colonic delivery. However such a kind of carrier present some drawbacks, for example this type of chemically synthetized substances may face regulatory issues if used in compositions designed to infants or young children. This study was indeed designed to adults. Some more "natural" solutions, e.g. with ingredients found in breast milk, would therefore be preferred for an administration to infants or young children.

Alternative solutions more appropriate to infants and young children should therefore be developed.

Human milk oligosaccharides (HMOs) are, collectively, the third largest solid constituents in human milk, after lactose and fat. HMOs usually consist of lactose at the reducing end with a carbohydrate core that often contains a fucose or a sialic acid at the non-reducing end. There are over one hundred milk oligosaccharides that have been isolated and characterized in human milk.

Some compositions using HMO ingredients, such as fucosylated oligosaccharides, lacto-N-tetraose, lacto-N-neotetraose and/or sialylated oligosaccharides, have been described for different health purposes, mainly immune purposes.

However the use of HMOs to control food intake in an infant or a young child has not been explored yet. There was also a limited focus on the use of HMOs to promote a healthy growth, e.g. a rate of growth of the infant that is closer to the one obtained for breast-fed infants.

There is clearly a need for developing suitable methods for such health benefits in infants and young children.

There is also a need to deliver such health benefits in a manner that is particularly suitable for the young subjects (infants and young children), in a manner that does not involve a classical pharmaceutical intervention as these infants or young children are particularly fragile.

There is a need to deliver such health benefits in these infants or young children in a manner that does not induce side effects and/or in a manner that is easy to deliver, and well accepted by the parents or health care practitioners.

There is also a need to deliver such benefits in a manner that does keep the cost of such delivery reasonable and affordable by most.

SUMMARY OF THE INVENTION

The present inventors have found that a composition comprising at least one fucosylated oligosaccharide and at least one N-acetylated oligosaccharide can increase colonic propionate production in an animal model.

Since propionate is known to control food intake and enhance satiety, such a composition can therefore advantageously be used to reduce and/or control food intake in an infant or a young child.

The nutritional composition can also be used to promote a healthy growth in an infant or a young child since the inventors have found that such a composition can also increase the lean mass, improve the relative intake, promote growth and reduce fat content in animal models.

In a particularly advantageous embodiment, the nutritional composition according to the invention comprises 2'-fucosyllactose (2-FL) and lacto-N-neotetraose (LNnT), and especially 2FL:LNnT in a weight ratio from 1:2 to 2:1.

FIGURES

Abbreviations: Pos ctr=positive control; HMO=human milk oligosaccharide, 2FL+LNnT in a weight ratio of 1:1 were tested; PDX=polydextrose.

Abbreviations: Ctrl pos=positive control; HMO=human milk oligosaccharide, 2FL+LNnT in a weight ratio of 1:1 were tested; PDX=polydextrose.

FIG. 3 represents the lean mass in grams of rats at 3 weeks of age (d=22 days).
Normal rats: Reference, rats nursed by dam
IUGR rats: IUGR (intrauterine growth restricted) rats, nursed by dam
IUGR rats/HMOs mix: IUGR rats, nursed by dam and supplemented with human milk oligosaccharides 2FL+LNnT in a weight ratio of 2:1.
$P<0.001$ vs. Normal rats; # $P<0.001$ vs IUGR rats FIG. 4 represent the relative intake (total food intake/average body weight) from days 22-29 (FIG. 4A; * $P<0.001$ vs. Normal rats; # $P<0.01$ vs IUGR rats) and from days 22-36 (FIG. 4B; * $P<0.001$ vs. Normal rats; # $P=0.03$ vs IUGR rats) of the following groups:
Normal rats: Reference, rats fed with a control diet
IUGR rats: IUGR (intrauterine growth restricted) rats; fed with a control diet
IUGR rats/HMOs mix: IUGR rats fed with a diet supplemented with 4.5 wt % of human milk oligosaccharides mix (2FL+LNnT in a weight ratio of 2:1).

FIG. 5 represent the relative intake (total food intake/average body weight) from days 22-29 (FIG. 5A) and from days 22-36 (FIG. 5B) of the following groups:
Normal rats: Reference, rats fed with a control diet
IUGR rats: IUGR (intrauterine growth restricted) rats; fed with a control diet
IUGR rats/2FL: IUGR rats fed with a diet supplemented with 4.5 wt % human milk oligosaccharide 2FL
IUGR rats/LNnT: IUGR rats fed with a diet supplemented with 4.5 wt % human milk oligosaccharide LNnT
IUGR rats/HMOs mix: IUGR rats fed with a diet supplemented with 4.5 wt % human milk oligosaccharides (2FL+LNnT in a weight ratio of 2:1).

DETAILED DESCRIPTION OF THE INVENTION

As used herein, the following terms have the following meanings.

The term "infant" means a child under the age of 12 months.

The expression "young child" means a child aged between one and three years, also called toddler.

An "infant or young child born by C-section" means an infant or young child who was delivered by caesarean. It means that the infant or young child was not vaginally delivered.

An "infant or young child vaginally born" means an infant or young child who was vaginally delivered and not delivered by caesarean.

A "preterm" or "premature" means an infant or young child who was not born at term. Generally it refers to an infant or young child born prior 36 weeks of gestation.

The expression "nutritional composition" means a composition which nourishes a subject. This nutritional composition is usually to be taken orally or intravenously. It may include a lipid or fat source, a carbohydrate source and/or a protein source. In a particular embodiment the nutritional composition is a ready-to-drink composition such as a ready-to-drink formula.

In a particular embodiment the composition of the present invention is a hypoallergenic nutritional composition. The expression "hypoallergenic nutritional composition" means a nutritional composition which is unlikely to cause allergic reactions.

In a particular embodiment the nutritional composition of the present invention is a "synthetic nutritional composition". The expression "synthetic nutritional composition" means a mixture obtained by chemical and/or biological means, which can be chemically identical to the mixture naturally occurring in mammalian milks (i.e. the synthetic nutritional composition is not breast milk).

The expression "infant formula" as used herein refers to a foodstuff intended for particular nutritional use by infants during the first months of life and satisfying by itself the nutritional requirements of this category of person (Article 2(c) of the European Commission Directive 91/321/EEC 2006/141/EC of 22 Dec. 2006 on infant formulae and follow-on formulae). It also refers to a nutritional composition intended for infants and as defined in Codex Alimentarius (Codex STAN 72-1981) and Infant Specialities (incl. Food for Special Medical Purpose). The expression "infant formula" encompasses both "starter infant formula" and "follow-up formula" or "follow-on formula".

A "follow-up formula" or "follow-on formula" is given from the 6th month onwards. It constitutes the principal liquid element in the progressively diversified diet of this category of person.

The expression "baby food" means a foodstuff intended for particular nutritional use by infants or young children during the first years of life.

The expression "infant cereal composition" means a foodstuff intended for particular nutritional use by infants or young children during the first years of life.

The term "fortifier" refers to liquid or solid nutritional compositions suitable for mixing with breast milk or infant formula.

The expression "weaning period" means the period during which the mother's milk is substituted by other food in the diet of an infant or young child.

The expressions "days/weeks/months/years of life", "days/weeks/months/years after birth" and "days/weeks/months/years of birth" can be used interchangeably.

The term "SCFA" means short chain fatty acid(s).

The expression "increasing colonic propionate production" means that the amount of propionate, when measured in the colon (or large intestine) or in a part thereof such as the caecum, is higher in an individual fed with the nutritional composition according to the present invention (i.e. comprising at least one fucosylated oligosaccharide and at least one N-acetylated oligosaccharide) in comparison with a standard composition (i.e. a nutritional composition not comprising at least one fucosylated oligosaccharide and at least one N-acetylated oligosaccharide) and/or in comparison with a standard composition supplemented with common fibers like polydextrose or pectin. The propionate production may be measured by techniques known by the skilled person such as by Gas-Liquid Chromatography.

The expression "reducing and/or controlling food intake" means that the amount of food ingested by the infant or young children when eating the nutritional composition of the present invention (i.e. comprising at least one fucosylated oligosaccharide and at least one N-acetylated oligosaccharide) will be reduced or regulated so that it gets lower than when eating a standard nutritional composition (i.e. not comprising at least one fucosylated oligosaccharide and at least one N-acetylated oligosaccharide). In some embodiments the ingested amount of the nutritional composition of the present invention gets closer or approximates to the amount ingested for breastfeeding. The intake or amount may refer to the quantity per meal or per day.

The term "growth" refers to growth in weight, height and/or head circumference of an infant or young child. In a particular embodiment it refers to the weight. The growth has to be understood as the evolution of the weight, height and/or head circumference over the aging of the infant or young child. These parameters do not exclusively increase during development of the infant, as indeed the standard curves of growth published by the WHO show that the weight of an infant may decrease in the first days of life of the infant. Therefore, the growth has to be understood as the overall growth of the infant over the first months of life. So the expressions "growth rate" and "rate of growth" can also be used alternatively to the term "growth".

The expressions "promoting a healthy growth" and "promoting an optimal growth" can be used interchangeably. They encompasses promoting a rate of growth which gets closer or approximates to the rate of growth of a breast-fed infant. They encompass promoting a growth that is qualified as normal by pediatricians so that it is not associated with providing health issues. These expressions also encompass preventing excessive growth or excessive body weight gain that may occur in formula-fed infants, especially in the first few months of life. The expression "promoting a healthy growth" may also encompass controlling weight management and/or avoiding weight gain, especially excessive weight gain, and/or promoting a lean mass increase (especially over a total weight or adipose mass increase) and/or reducing fat content.

"Satiety" is the feeling of fullness after eating that suppresses the urge to eat for a period of time after a meal. The expression "increasing the satiety responsiveness" (or "inducing satiety") encompasses getting satiety earlier in time (i.e. faster) in an infant or young child administered the nutritional composition of the present invention (i.e. comprising at least one fucosylated oligosaccharide and at least one N-acetylated oligosaccharide) in comparison to an infant or young child administered a conventional nutritional composition (i.e. not comprising at least one fucosylated oligosaccharide and at least one N-acetylated oligosaccharide), i.e. less amount of food will be ingested in order for the infant or young child to feel fullness. It may also mean "regulating (e.g. decreasing/lowering) appetite". Satiety may be reached at a time that gets closer or that approximates to the time obtained when breastfeeding.

The "mother's milk" should be understood as the breast milk or the colostrum of the mother.

The term "HMO" or "HMOs" refers to human milk oligosaccharide(s). These carbohydrates are resistant to enzymatic hydrolysis by digestive enzymes (e.g pancreatic and/or brush border), indicating that they may display functions not directly related to their caloric value. It has especially been illustrated that they play a vital role in the early development of infants and young children, such as the maturation of the immune system. Many different kinds of HMOs are found in the human milk. Each individual oligosaccharide is based on a combination of glucose, galactose, sialic acid (N-acetylneuraminic acid), fucose and/or N-acetylglucosamine with many and varied linkages between them, thus accounting for the enormous number of different oligosaccharides in human milk—over 130 such structures have been identified so far. Almost all of them have a lactose moiety at their reducing end while sialic acid and/or fucose (when present) occupy terminal positions at the non-reducing ends. The HMOs can be acidic (e.g. charged sialic acid containing oligosaccharide) or neutral (e.g. fucosylated oligosaccharide). Some examples of HMOs are the fucosylated oligosaccharides, the N-acetylated oligosaccharides and/or the sialylated oligosaccharides.

A "fucosylated oligosaccharide" is an oligosaccharide having a fucose residue. It has a neutral nature. Some examples are 2'-FL (2'-fucosyllactose or 2-fucosyllactose or 2FL or 2-FL), 3-FL (3-fucosyllactose), difucosyllactose, lacto-N-fucopentaose (e.g. lacto-N-fucopentaose I, lacto-N-fucopentaose II, lacto-N-fucopentaose III, lacto-N-fucopentaose V), lacto-N-fucohexaose, lacto-N-difucohexaose I, fucosyllacto-N-hexaose, fucosyllacto-N-neohexaose, difucosyllacto-N-hexaose I, difucosyllacto-N-neohexaose II and any combination thereof.

The expressions "fucosylated oligosaccharides comprising a 2'-fucosyl-epitope" and "2-fucosylated oligosaccharides" encompass fucosylated oligosaccharides with a certain homology of form since they contain a 2'-fucosyl-epitope, therefore a certain homology of function can be expected.

The expression "N-acetylated oligosaccharide(s)" encompasses both "N-acetyl-lactosamine" and "oligosaccharide(s) containing N-acetyl-lactosamine". They are neutral oligosaccharides having an N-acetyl-lactosamine residue. Suitable examples are LNT (lacto-N-tetraose), para-lacto-N-neohexaose (para-LNnH), LNnT (lacto-N-neotetraose) or any combination thereof. Other examples are lacto-N- hexaose, lacto-N-neohexaose, para-lacto-N-hexaose, para-lacto-N-neohexaose, lacto-N-octaose, lacto-N-neooctaose, iso-lacto-N-octaose, para-lacto-N-octaose and lacto-N-decaose.

The expression "at least one fucosylated oligosaccharide" and "at least one N-acetylated oligosaccharide" means "at least one type of fucosylated oligosaccharide" and "at least one type of N-acetylated oligosaccharide".

A "precursor of HMO" is a key compound that intervenes in the manufacture of HMO, such as sialic acid and/or fucose.

A "sialylated oligosaccharide" is a charged sialic acid containing oligosaccharide, i.e. an oligosaccharide having a sialic acid residue. It has an acidic nature. Some examples are 3-SL (3' sialyllactose) and 6-SL (6' sialyllactose).

The expressions "galacto-oligosaccharide", "galactooligosaccharide" and "GOS" can be used interchangeably. They refer to an oligosaccharide comprising two or more galactose molecules which has no charge and no N-acetyl residue (i.e. they are neutral oligosaccharide). In a particular embodiment, said two or more galactose molecules are linked by a β-1,2, β-1,3, β-1,4 or β3-1,6 linkage. In another embodiment, "galacto-oligosaccharide" and "GOS" also include oligosaccharides comprising one galactose molecule and one glucose molecule (i.e. disaccharides) which are linked by a β-1,2, β-1,3 or β-1,6 linkage.

The nutritional composition of the present invention can be in solid form (e.g. powder) or in liquid form. The amount of the various ingredients (e.g. the oligosaccharides) can be expressed in g/100 g of composition on a dry weight basis when it is in a solid form, e.g. a powder, or as a concentration in g/L of the composition when it refers to a liquid form (this latter also encompasses liquid composition that may be obtained from a powder after reconstitution in a liquid such as milk, water . . . , e.g. a reconstituted infant formula or follow-on/follow-up formula or infant cereal product or any other formulation designed for infant nutrition).

The term "prebiotic" means non-digestible carbohydrates that beneficially affect the host by selectively stimulating the growth and/or the activity of healthy bacteria such as bifidobacteria in the colon of humans (Gibson G R, Roberfroid M B. *Dietary modulation of the human colonic microbiota: introducing the concept of prebiotics. J Nutr.* 1995; 125:1401-12).

The term "probiotic" means microbial cell preparations or components of microbial cells with a beneficial effect on the health or well-being of the host. (Salminen S, Ouwehand A. Benno Y. et al. "*Probiotics: how should they be defined*" Trends Food Sci. Technol. 1999:10 107-10). The microbial cells are generally bacteria or yeasts.

The term "cfu" should be understood as colony-forming unit.

All percentages are by weight unless otherwise stated.

In addition, in the context of the invention, the terms "comprising" or "comprises" do not exclude other possible elements. The composition of the present invention, including the many embodiments described herein, can comprise, consist of, or consist essentially of the essential elements and limitations of the invention described herein, as well as any additional or optional ingredients, components, or limitations described herein or otherwise depending on the needs.

Any reference to prior art documents in this specification is not to be considered an admission that such prior art is widely known or forms part of the common general knowledge in the field.

The invention will now be described in further details. It is noted that the various aspects, features, examples and embodiments described in the present application may be compatible and/or combined together.

The present invention therefore refers to a nutritional composition comprising at least one fucosylated oligosaccharide and at least one N-acetylated oligosaccharide, for use in reducing and/or controlling food intake in an infant or a young child It can also be used for promoting a healthy growth in an infant or a young child.

Without being bound by theory, the inventors of the present invention believe that the fucosylated oligosaccharide(s) and the N-acetylated oligosaccharide(s) act synergically to surprisingly provide the above-mentioned health benefits. This particular combination of oligosaccharides would significantly increase the propionate production of an individual and therefore be useful in reducing and/or controlling food intake and/or in promoting a healthy growth in an infant or a young child.

The nutritional composition of the present invention comprises at least one fucosylated oligosaccharide. There can be one or several types of fucosylated oligosaccharide(s). The fucosylated oligosaccharide(s) can indeed be selected from the list comprising 2'-fucosyllactose, 3'fucosyllactose, difucosyllactose, lacto-N-fucopentaose (such as lacto-N-fucopentaose I, lacto-N-fucopentaose II, lacto-N-fucopentaose III, lacto-N-fucopentaose V), lacto-N-fucohexaose, lacto-N-difucohexaose I, fucosyllacto-N-hexaose, fucosyllacto-N-neohexaose (such as fucosyllacto-N-neohexaose I, fucosyl-lacto-N-neohexaose II), difucosyllacto-N-hexaose I, difuco-lacto-N-neohexaose, difucosyllacto-N-neohexaose I, difucosyllacto-N-neohexaose II, fucosyl-para-Lacto-N-hexaose, tri-fuco-para-Lacto-N-hexaose I and any combination thereof.

In some particular embodiments the fucosylated oligosaccharide comprises a 2'-fucosyl-epitope. It can be for example selected from the list comprising 2'-fucosyllactose, difucosyllactose, lacto-N-fucopentaose, lacto-N-fucohexaose, lacto-N-difucohexaose, fucosyllacto-N-hexaose, fucosyllacto-N-neohexaose, difucosyllacto-N-hexaose difuco-lacto-N-neohexaose, difucosyllacto-N-neohexaose, fucosyl-para-Lacto-N-hexaose and any combination thereof.

In a preferred embodiment, the nutritional composition according to the invention comprises 2'-fucosyllactose (or 2FL, or 2'FL, or 2-FL or 2'-FL). In a particular embodiment, there is no other type of fucosylated oligosaccharide than 2'-fucosyllactose, i.e. the nutritional composition of the invention comprises only 2'-fucosyllactose as fucosylated oligosaccharide.

The fucosylated oligosaccharide(s) may be isolated by chromatography or filtration technology from a natural source such as animal milks. Alternatively, it may be produced by biotechnological means using specific fucosyl-transferases and/or fucosidases either through the use of enzyme-based fermentation technology (recombinant or natural enzymes) or microbial fermentation technology. In the latter case, microbes may either express their natural enzymes and substrates or may be engineered to produce respective substrates and enzymes. Single microbial cultures and/or mixed cultures may be used. Fucosylated oligosaccharide formation can be initiated by acceptor substrates starting from any degree of polymerization (DP), from DP=1 onwards. Alternatively, fucosylated oligosaccharides may be produced by chemical synthesis from lactose and free fucose. Fucosylated oligosaccharides are also available for example from Kyowa, Hakko, Kogyo of Japan.

The composition of the present invention also comprises at least one the N-acetylated oligosaccharide. There can be one or several types of N-acetylated oligosaccharide. The N-acetylated oligosaccharide(s) can be for example lacto-N-tetraose (LNT), lacto-N-neotetraose (LNnT) or any combination thereof. In some particular embodiments the N-acetylated oligosaccharide is lacto-N-neotetraose (LNnT), para-lacto-N-neohexaose (para-LNnH) or any combination thereof. In some particular embodiments the N-acetylated oligosaccharide is LNnT. In some particular embodiments the N-acetylated oligosaccharide is LNT. In some other particular embodiments the N-acetylated oligosaccharide is a mixture of LNT and LNnT. In some particular embodiments the composition comprises both LNT and LNnT in a ratio LNT:LNnT between 5:1 and 1:2, or from 2:1 to 1:1, or from 2:1.2 to 2:1.6.

In a preferred embodiment, the nutritional composition according to the invention comprises lacto-N-neotetraose (LNnT). In a particular embodiment, there is no other type of N-acetylated oligosaccharide than lacto-N-neotetraose (LNnT), i.e. the nutritional composition of the invention comprises only lacto-N-neotetraose (LNnT) as N-acetylated oligosaccharide.

The N-acetylated oligosaccharide(s) may be synthesised chemically by enzymatic transfer of saccharide units from donor moieties to acceptor moieties using glycosyltransferases as described for example in U.S. Pat. No. 5,288,637 and WO 96/10086. Alternatively, LNT and LNnT may be prepared by chemical conversion of Keto-hexoses (e.g. fructose) either free or bound to an oligosaccharide (e.g. lactulose) into N-acetylhexosamine or an N-acetyl-hexosamine-containing oligosaccharide as described in Wrodnigg, T. M.; Stutz, A. E. (1999) Angew. Chem. Int. Ed. 38:827-828. N-acetyl-lactosamine produced in this way may then be transferred to lactose as the acceptor moiety. The N-acetylated oligosaccharide(s) may also be produced by biotechnological means based on microbial fermentation technology.

In a particularly advantageous embodiment of the present invention, the nutritional composition comprises 2'-fucosyllactose (2FL) and lacto-N-neotetraose (LNnT). In another specific embodiment, the nutritional composition of the present invention comprises an oligosaccharide mixture that consists of 2'-fucosyllactose (2-FL) and lacto-N-neotetraose (LNnT). In other words, the nutritional composition of the invention comprises only 2'-fucosyllactose (2-FL) as fucosylated oligosaccharide and only lacto-N-neotetraose (LNnT) as N-acetylated oligosaccharide.

In some embodiments the fucosylated oligosaccharide(s): N-acetylated oligosaccharide(s) (e.g. 2FL:LNnT) weight ratio in the nutritional composition of the present invention is from 1:10 to 12:1, such as from 1:7 to 10:1 or from 1:5 to 5:1 or from 2:1 to 5:1 or from 1:3 to 3:1, or from 1:2 to 2:1, or from 1:1 to 3:1, or from 1:5 to 1:0.5, for example 1:1 or 2:1; for example 1:1 or 2:1 or 10:1.

The fucosylated oligosaccharide(s) and the N-acetylated oligosaccharide(s) present into the nutritional composition of the present invention may be in a total amount of from 0.1 to 10 wt %, such as from 0.5 to 7 wt % or from 1 to 5 wt % of the nutritional composition before reconstitution with water. For reconstituted ready-to-drink formula, the total amount could be from 0.01 to 1%, more preferably 0.05 to 0.7% or 0.1 to 0.5%.

The nutritional composition of the present invention may for example comprise:
fucosylated oligosaccharide(s) in a total amount of 0.2-5 g/L, for example 0.5-4.5 g/L or 1-4 g/L of the composition, or in a total amount of 0.13-3.48 g/100 g, for example 0.34-3.13 g/100 g or 0.69-2.78 g/100 g of composition on a dry weight basis; and/or N-acetylated oligosaccharide(s) in a total amount of 0.05-5 g/L, for example 0.1-2 g/L or 0.1-1 g/L of the composition, or in a total amount of 0.0.03-3.48 g/100 g, for example 0.07-1.4 g/100 g or 0.07-0.7 g/100 g of composition on a dry weight basis.

The nutritional composition according to the present invention may also comprise at least another oligosaccharide(s) (i.e. other than the fucosylated oligosaccharide(s) and N-acetylated oligosaccharide(s) necessarily present in the composition) and/or at least a fiber(s) and/or at least a precursor(s) of human milk oligosaccharide(s). The other oligosaccharide and/or fiber and/or precursor may be selected from the list comprising galacto-oligosaccharides (GOS), fructo-oligosaccharides (FOS), inulin, xylooligosaccharides (XOS), polydextrose, sialylated oligosaccharides, sialic acid, fucose and any combination thereof. They may be in an amount between 0 and 10% by weight of composition.

Suitable commercial products that can be used in addition to the oligosaccharides comprised in the oligosaccharide mixture to prepare the nutritional compositions according to the invention include combinations of FOS with inulin such as the product sold by BENEO under the trademark Orafti, or polydextrose sold by Tate & Lyle under the trademark STA-LITE®.

In a particular embodiment, the composition according to the invention can comprise sialylated oligosaccharide(s). There can be one or several sialylated oligosaccharide(s). The sialylated oligosaccharide(s) can be selected from the group comprising 3' sialyllactose (3-SL), 6' sialyllactose (6-SL), and any combination thereof. In some embodiments of the invention the composition comprises 3-SL and 6-SL. In some particular embodiments the ratio between 3'-sialyllactose (3-SL) and 6'-sialyllactose (6-SL) can be in the range between 5:1 and 1:10, or from 3:1 and 1:1, or from 1:1 to 1:10. In some specific embodiments the sialylated oligosaccharide of the composition is 6' sialyllactose (6-SL).

The sialylated oligosaccharide(s) may be isolated by chromatographic or filtration technology from a natural source such as animal milks. Alternatively, they may be produced by biotechnological means using specific sialyltransferases or sialidases, neuraminidases, either by an enzyme based fermentation technology (recombinant or natural enzymes), by chemical synthesis or by a microbial fermentation technology. In the latter case microbes may either express their natural enzymes and substrates or may be engineered to produce respective substrates and enzymes. Single microbial cultures or mixed cultures may be used. Sialyl-oligosaccharide formation can be initiated by acceptor substrates starting from any degree of polymerisation (DP), from DP=1 onwards. Alternatively, sialyllactoses may be produced by chemical synthesis from lactose and free N'-acetylneuraminic acid (sialic acid). Sialyllactoses are also commercially available for example from Kyowa Hakko Kogyo of Japan.

In particular examples the composition may comprise sialylated oligosaccharide(s) in a total amount of from 0.05 to 5 g/L of, for example from 0.1 to 4 g/L, or from 0.3 to 2 g/L of the composition, or in a total amount of from 0.03 to 3.5 g/100 g, for example from 0.1 to 2 g or from 0.2 to 1 g/100 g of composition on a dry weight basis.

In a particular embodiment, the nutritional composition can also contain at least one BMO (bovine milk oligosaccharide). In a particular embodiment, the nutritional composition may additionally comprise an oligosaccharide mixture ("BMOS") that comprises from 0.1 to 4.0 wt % of N-acetylated oligosaccharide(s), from 92.0 to 99.5 wt % of the galacto-oligosaccharide(s) and from 0.2 to 4.0 wt % of the sialylated oligosaccharide(s). WO2006087391 and WO2012160080 provide some examples of production of a BMOs mixture.

In some particular embodiments of the present invention, the nutritional composition does not contain any sialylated oligosaccharide(s), any GOS and/or any bovine milk oligosaccharide.

The composition according to the present invention may optionally also comprise at least one precursor of human milk oligosaccharide. There can be one or several precursor(s). For example the precursor of human milk oligosaccharide is sialic acid, fucose or a mixture thereof. In some particular embodiments the composition comprises sialic acid.

In particular examples the composition comprises from 0 to 3 g/L of precursor(s) of human milk oligosaccharide, or from 0 to 2 g/L, or from 0 to 1 g/L, or from 0 to 0.7 g/L, or from 0 to 0.5 g/L or from 0 to 0.3 g/L, or from 0 to 0.2 g/L of precursor(s) of human milk oligosaccharide.

The composition according to the invention can contain from 0 to 2.1 g of precursor(s) of human milk oligosaccharide per 100 g of composition on a dry weight basis, e.g. from 0 to 1.5 g or from 0 to 0.8 g or from 0 to 0.15 g of precursor(s) of human milk oligosaccharide per 100 g of composition on a dry weight basis.

The nutritional composition of the present invention can further comprise at least one probiotic (or probiotic strain), such as a probiotic bacterial strain.

The probiotic microorganisms most commonly used are principally bacteria and yeasts of the following genera: *Lactobacillus* spp., *Streptococcus* spp., *Enterococcus* spp., *Bifidobacterium* spp. and *Saccharomyces* spp.

In some particular embodiments, the probiotic is a probiotic bacterial strain. In some specific embodiments, it is particularly *Bifidobacteria* and/or *Lactobacilli*.

Suitable probiotic bacterial strains include *Lactobacillus rhamnosus* ATCC 53103 available from Valio Oy of Finland under the trademark LGG, *Lactobacillus rhamnosus* CGMCC 1.3724, *Lactobacillus paracasei* CNCM 1-2116, *Lactobacillus johnsonii* CNCM 1-1225, *Streptococcus salivarius* DSM 13084 sold by BLIS Technologies Limited of New Zealand under the designation K12, *Bifidobacterium lactis* CNCM 1-3446 sold inter alia by the Christian Hansen company of Denmark under the trademark Bb 12, *Bifidobacterium longum* ATCC BAA-999 sold by Morinaga Milk Industry Co. Ltd. of Japan under the trademark BB536, *Bifidobacterium breve* sold by Danisco under the trademark Bb-03, *Bifidobacterium breve* sold by Morinaga under the trade mark M-16V, *Bifidobacterium infantis* sold by Procter & Gamble Co. under the trademark Bifantis and *Bifidobacterium breve* sold by Institut Rosell (Lallemand) under the trademark R0070.

The nutritional composition according to the invention may contain from 10e3 to 10e12 cfu of probiotic strain, more preferably between 10e7 and 10e12 cfu such as between 10e8 and 10e10 cfu of probiotic strain per g of composition on a dry weight basis.

In one embodiment the probiotics are viable. In another embodiment the probiotics are non-replicating or inactivated. There may be both viable probiotics and inactivated probiotics in some other embodiments.

The nutritional composition of the invention can further comprise at least one phage (bacteriophage) or a mixture of phages, preferably directed against pathogenic *Streptococci*, *Haemophilus*, *Moraxella* and *Staphylococci*.

The nutritional composition according to the invention can be for example an infant formula, a starter infant formula, a follow-on or follow-up formula, a baby food, an infant cereal composition, a fortifier such as a human milk fortifier, or a supplement. In some particular embodiments, the composition of the invention is an infant formula, a fortifier or a supplement that may be intended for the first 4 or 6 months of age. In a preferred embodiment the nutritional composition of the invention is an infant formula.

In some other embodiments the nutritional composition of the present invention is a fortifier. The fortifier can be a breast milk fortifier (e.g. a human milk fortifier) or a formula fortifier such as an infant formula fortifier or a follow-on/follow-up formula fortifier.

When the nutritional composition is a supplement, it can be provided in the form of unit doses.

The nutritional composition of the present invention can be in solid (e.g. powder), liquid or gelatinous form.

The nutritional composition according to the invention generally contains a protein source. The protein can be in an amount of from 1.5 to 3 g per 100 kcal. In some embodiments, especially when the composition is intended for premature infants, the protein amount can be between 2.4 and 4 g/100 kcal or more than 3.6 g/100 kcal. In some other embodiments the protein amount can be below 2.0 g per 100 kcal, e.g. between 1.8 to 2 g/100 kcal, or in an amount below 1.8 g per 100 kcal.

The type of protein is not believed to be critical to the present invention provided that the minimum requirements for essential amino acid content are met and satisfactory growth is ensured. Thus, protein sources based on whey, casein and mixtures thereof may be used as well as protein sources based on soy. As far as whey proteins are concerned, the protein source may be based on acid whey or sweet whey or mixtures thereof and may include alpha-lactalbumin and beta-lactoglobulin in any desired proportions.

In some advantageous embodiments the protein source is whey predominant (i.e. more than 50% of proteins are coming from whey proteins, such as 60% or 70%).

The proteins may be intact or hydrolysed or a mixture of intact and hydrolysed proteins. By the term "intact" is meant that the main part of the proteins are intact, i.e. the molecular structure is not altered, for example at least 80% of the proteins are not altered, such as at least 85% of the proteins are not altered, preferably at least 90% of the proteins are not altered, even more preferably at least 95% of the proteins are not altered, such as at least 98% of the proteins are not altered. In a particular embodiment, 100% of the proteins are not altered.

The term "hydrolysed" means in the context of the present invention a protein which has been hydrolysed or broken down into its component amino acids.

The proteins may be either fully or partially hydrolysed. It may be desirable to supply partially hydrolysed proteins (degree of hydrolysis between 2 and 20%), for example for infants or young children believed to be at risk of developing cow's milk allergy. If hydrolysed proteins are required, the hydrolysis process may be carried out as desired and as is known in the art. For example, whey protein hydrolysates may be prepared by enzymatically hydrolysing the whey fraction in one or more steps. If the whey fraction used as the starting material is substantially lactose free, it is found that the protein suffers much less lysine blockage during the hydrolysis process. This enables the extent of lysine blockage to be reduced from about 15% by weight of total lysine to less than about 10% by weight of lysine; for example about 7% by weight of lysine which greatly improves the nutritional quality of the protein source.

In an embodiment of the invention at least 70% of the proteins are hydrolysed, preferably at least 80% of the proteins are hydrolysed, such as at least 85% of the proteins are hydrolysed, even more preferably at least 90% of the proteins are hydrolysed, such as at least 95% of the proteins are hydrolysed, particularly at least 98% of the proteins are hydrolysed. In a particular embodiment, 100% of the proteins are hydrolysed.

In one particular embodiment the proteins of the nutritional composition are hydrolyzed, fully hydrolyzed or partially hydrolyzed. The degree of hydrolysis (DH) of the protein can be between 8 and 40, or between 20 and 60 or between 20 and 80 or more than 10, 20, 40, 60, 80 or 90.

In a particular embodiment the nutritional composition according to the invention is a hypoallergenic composition. In another particular embodiment the composition according to the invention is a hypoallergenic nutritional composition.

The nutritional composition according to the present invention generally contains a carbohydrate source. This is particularly preferable in the case where the nutritional composition of the invention is an infant formula. In this case, any carbohydrate source conventionally found in infant formulae such as lactose, sucrose, saccharose, maltodextrin, starch and mixtures thereof may be used although one of the preferred sources of carbohydrates is lactose.

The nutritional composition according to the present invention generally contains a source of lipids. This is particularly relevant if the nutritional composition of the invention is an infant formula. In this case, the lipid source may be any lipid or fat which is suitable for use in infant formulae. Some suitable fat sources include palm oil, high oleic sunflower oil and high oleic safflower oil. The essential fatty acids linoleic and α-linolenic acid may also be added, as well small amounts of oils containing high quantities of preformed arachidonic acid and docosahexaenoic acid such as fish oils or microbial oils. The fat source may have a ratio of n-6 to n-3 fatty acids of about 5:1 to about 15:1; for example about 8:1 to about 10:1.

The nutritional composition of the invention may also contain all vitamins and minerals understood to be essential in the daily diet and in nutritionally significant amounts. Minimum requirements have been established for certain vitamins and minerals. Examples of minerals, vitamins and other nutrients optionally present in the composition of the invention include vitamin A, vitamin B1, vitamin B2, vitamin B6, vitamin B12, vitamin E, vitamin K, vitamin C, vitamin D, folic acid, inositol, niacin, biotin, pantothenic acid, choline, calcium, phosphorous, iodine, iron, magnesium, copper, zinc, manganese, chlorine, potassium, sodium, selenium, chromium, molybdenum, taurine, and L-carnitine. Minerals are usually added in salt form. The presence and amounts of specific minerals and other vitamins will vary depending on the intended population.

If necessary, the nutritional composition of the invention may contain emulsifiers and stabilisers such as soy, lecithin, citric acid esters of mono- and diglycerides, and the like.

The nutritional composition of the invention may also contain other substances which may have a beneficial effect such as lactoferrin, nucleotides, nucleosides, and the like.

The nutritional composition of the invention may also contain carotenoid(s). In some particular embodiments of the invention, the nutritional composition of the invention does not comprise any carotenoid.

The nutritional composition according to the invention may be prepared in any suitable manner. A composition will now be described by way of example.

For example, a formula such as an infant formula may be prepared by blending together the protein source, the carbohydrate source and the fat source in appropriate proportions. If used, the emulsifiers may be included at this point. The vitamins and minerals may be added at this point but they are usually added later to avoid thermal degradation. Any lipophilic vitamins, emulsifiers and the like may be dissolved into the fat source prior to blending. Water, preferably water which has been subjected to reverse osmosis, may then be mixed in to form a liquid mixture. The temperature of the water is conveniently in the range between about 50° C. and about 80° C. to aid dispersal of the ingredients. Commercially available liquefiers may be used to form the liquid mixture.

The fucosylated oligosaccharide(s) and the N-acetylated oligosaccharide(s) may be added at this stage, especially if the final product is to have a liquid form. If the final product is to be a powder, they may likewise be added at this stage if desired.

The liquid mixture is then homogenised, for example in two stages.

The liquid mixture may then be thermally treated to reduce bacterial loads, by rapidly heating the liquid mixture to a temperature in the range between about 80° C. and about 150° C. for a duration between about 5 seconds and about 5 minutes, for example. This may be carried out by means of steam injection, an autoclave or a heat exchanger, for example a plate heat exchanger.

Then, the liquid mixture may be cooled to between about 60° C. and about 85° C. for example by flash cooling. The liquid mixture may then be again homogenised, for example in two stages between about 10 MPa and about 30 MPa in the first stage and between about 2 MPa and about 10 MPa in the second stage. The homogenised mixture may then be further cooled to add any heat sensitive components, such as vitamins and minerals. The pH and solids content of the homogenised mixture are conveniently adjusted at this point.

If the final product is to be a powder, the homogenised mixture is transferred to a suitable drying apparatus such as a spray dryer or freeze dryer and converted to powder. The powder should have a moisture content of less than about 5% by weight. The fucosylated oligosaccharide(s) and the N-acetylated oligosaccharide(s) may also or alternatively be added at this stage by dry-mixing or by blending them in a syrup form of crystals, along with the probiotic strain(s) (if used), and the mixture is spray-dried or freeze-dried.

If a liquid composition is preferred, the homogenised mixture may be sterilised then aseptically filled into suitable containers or may be first filled into the containers and then retorted.

In another embodiment, the composition of the invention may be a supplement. The supplement may be in the form of tablets, capsules, pastilles or a liquid for example. The supplement may further contain protective hydrocolloids (such as gums, proteins, modified starches), binders, film forming agents, encapsulating agents/materials, wall/shell materials, matrix compounds, coatings, emulsifiers, surface active agents, solubilizing agents (oils, fats, waxes, lecithins etc.), adsorbents, carriers, fillers, co-compounds, dispersing agents, wetting agents, processing aids (solvents), flowing agents, taste masking agents, weighting agents, jellifying agents and gel forming agents. The supplement may also contain conventional pharmaceutical additives and adjuvants, excipients and diluents, including, but not limited to, water, gelatine of any origin, vegetable gums, lignin-sulfonate, talc, sugars, starch, gum arabic, vegetable oils, polyalkylene glycols, flavouring agents, preservatives, stabilizers, emulsifying agents, buffers, lubricants, colorants, wetting agents, fillers, and the like.

Further, the supplement may contain an organic or inorganic carrier material suitable for oral or parenteral administration as well as vitamins, minerals trace elements and other micronutrients in accordance with the recommendations of Government bodies such as the USRDA.

The nutritional composition according to the invention is for use in infants or young children. The infants or young children may be born term or preterm. In a particular embodiment the nutritional composition of the invention is for use in infants or young children that were born preterm. Preterm infants may be at increased risk of poor nutrient utilization, impaired lean body mass growth, fat accumulation in the visceral area and metabolic disease later in life. So in a particular embodiment the nutritional composition of the invention is for use in preterm infants.

The nutritional composition of the present invention may also be used in an infant or a young child that was born by C-section or that was vaginally delivered.

In some embodiments the nutritional composition according to the invention can be for use before and/or during the weaning period.

In some embodiments the nutritional composition according to the invention is for use in infants or young children at risk and/or in need.

The infants or young children at risk and/or in need may be bottle-fed and/or formula-fed infants or young children.

The infants or young children at risk and/or in need may be infants or young children who meet at least one of the following criteria:
 they have difficulties with controlling their food intake or
  they have an abnormal (especially higher) food intake (e.g. they have a higher appetite), for example:
   i) they eat more than other infants or young children of the same age and of the same size (weight and length); and/or
   ii) they have an altered perception of satiety, for example a delayed satiety responsiveness (that might be due to physiological or anatomical reasons); and/or
 they have an excessive weight gain during the first few months of life.

In a particular example, the nutritional composition of the present invention may be used in infants or young children who were IUGR (intrauterine growth restricted). This particular population is at risk and/or in need since they will have a higher appetite to compensate their growth retardation. But they may not eat in a healthy way with standard formulations, e.g. they may have a higher total weight or adipose mass increase over the lean mass increase, which may lead to the development and programming for future health conditions including later in life obesity or future related comorbidities. The nutritional composition of the present invention is believed to provide a healthy growth.

The nutritional composition can be administered (or given or fed) at an age and for a period that depends on the possibilities and needs.

The nutritional composition may be used for prevention purposes and/or for treatment purposes.

The nutritional composition can for example be given immediately after birth of the infants, especially when it is used for prevention purposes. The composition of the invention can also be given during the first week of life of the infant, or during the first 2 weeks of life, or during the first 3 weeks of life, or during the first month of life, or during the first 2 months of life, or during the first 3 months of life, or during the first 4 months of life, or during the first 6 months of life, or during the first 8 months of life, or during the first 10 months of life, or during the first year of life, or during the first two years of life or even more. In some particularly advantageous embodiments of the invention, the nutritional composition is given (or administered) to an infant within the first 4 or 6 months of birth of said infant. In some other embodiments, the nutritional composition of the invention is given few days (e.g. 1, 2, 3, 5, 10, 15, 20 . . . ), or few weeks (e.g. 1, 2, 3, 4, 5, 6, 7, 8, 9, 10 . . . ), or few months (e.g. 1, 2, 3, 4, 5, 6, 7, 8, 9, 10 . . . ) after birth. This may be especially the case when the infant is premature, but not necessarily.

For treatment purposes, the composition may be given once symptoms appear, e.g. when a mother or a paediatrician discovers that its infant or young child is too often hungry and/or needs abnormal (higher) food amounts before reaching satiety and/or has an excessive growth/weight gain especially during the first few months of life. It may be given up to the symptoms disappear, or several days/weeks/months after said disappearance.

In one embodiment the composition of the invention is given to the infant or young child as a supplementary composition to the mother's milk. In some embodiments the infant or young child receives the mother's milk during at least the first 2 weeks, first 1, 2, 4, or 6 months. In one embodiment the nutritional composition of the invention is given to the infant or young child after such period of mother's nutrition, or is given together with such period of mother's milk nutrition. In another embodiment the composition is given to the infant or young child as the sole or primary nutritional composition during at least one period of time, e.g. after the $1^{st}$, $2^{nd}$ or $4^{th}$ month of life, during at least 1, 2, 4 or 6 months.

In one embodiment the nutritional composition of the invention is a complete nutritional composition (fulfilling all or most of the nutritional needs of the subject). In another embodiment the nutrition composition is a supplement or a fortifier intended for example to supplement human milk or to supplement an infant formula or a follow-on formula.

The present inventors have found that a specific HMOs intervention in an animal model significantly increased its propionate production in the caecum (a part of the colon). As mentioned in the background section, propionate is known to be a satiety enhancing factor and to control food intake.

They have also found that this specific HMOs intervention can also increase the lean mass, improve the relative intake, promote growth and reduce fat content in animal models.

The nutritional composition according to the present invention would therefore be useful in reducing and/or controlling food intake and/or in promoting a healthy growth in an infant or a young child.

The health benefits targeted in the present invention may be obtained by increasing the satiety responsiveness in said infant or a young child.

These health benefits may be obtained with the nutritional composition according to the present invention by increasing the colonic propionate production in said infant or young child, especially the propionate production in the caecum.

These represent new clinical situations where food intake and growth can be targeted in a new way.

In a particular embodiment the propionate production is measured by Gas-Liquid Chromatography and it can be expressed in nmol/mg dry weight.

In a particular embodiment, the colonic propionate production is increased by at least 10%, or at least 15% or at least 20% or at least 30% or at least 40% or at least 50% or at least 60% in comparison to the colonic propionate production obtained with a nutritional composition without at least one fucosylated oligosaccharide and at least one N-acetylated oligosaccharide.

In a particular embodiment, the colonic propionate production is increased by at least 10%, or at least 15% or at least 20% or at least 30% or at least 40% or at least 50% or at least 60% or at least 70% in comparison to the colonic propionate production obtained with a nutritional composition supplemented with common fibers like polydextrose or pectin.

The nutritional composition according to the present invention may also be used especially to avoid excessive weight gain in an infant or a young child and/or to promote lean mass increase (or to increase lean mass).

Other Objects:

Another object of the present invention is a nutritional composition comprising at least one fucosylated oligosaccharide and at least one N-acetylated oligosaccharide for use in increasing the satiety responsiveness in an infant or a young child.

Another object of the present invention is the use of at least one fucosylated oligosaccharide and at least one N-acetylated oligosaccharide in the preparation of a nutritional composition for reducing and/or controlling food intake in an infant or a young child.

Another object of the present invention is the use of at least one fucosylated oligosaccharide and at least one N-acetylated oligosaccharide in the preparation of a nutritional composition for promoting a healthy growth in an infant or a young child.

Another object of the present invention is the use of at least one fucosylated oligosaccharide and at least one N-acetylated oligosaccharide in the preparation of a nutritional composition for increasing the satiety responsiveness in an infant or a young child.

Another object of the present invention is a pharmaceutical composition comprising at least one fucosylated oligosaccharide and at least one N-acetylated oligosaccharide for use in reducing and/or controlling food intake in an infant or a young child.

Another object of the present invention is a pharmaceutical composition comprising at least one fucosylated oligosaccharide and at least one N-acetylated oligosaccharide for use in promoting a healthy growth in an infant or a young child.

Another object of the present invention is a pharmaceutical composition comprising at least one fucosylated oligosaccharide and at least one N-acetylated oligosaccharide for use in increasing the satiety responsiveness in an infant or a young child.

Another object of the present invention is the use of at least one fucosylated oligosaccharide and at least one N-acetylated oligosaccharide for reducing and/or controlling food intake in an infant or a young child.

Another object of the present invention is the use of at least one fucosylated oligosaccharide and at least one N-acetylated oligosaccharide for promoting a healthy growth in an infant or a young child.

Another object of the present invention is the use of at least one fucosylated oligosaccharide and at least one N-acetylated oligosaccharide or a nutritional composition comprising thereof, for increasing the satiety responsiveness in an infant or a young child.

Another object of the present invention refers to a method for reducing and/or controlling food intake in an infant or a young child, said method comprising administering to said infant or young child a nutritional composition comprising at least one fucosylated oligosaccharide and at least one N-acetylated oligosaccharide.

Another object of the present invention refers to a method for increasing the satiety responsiveness in an infant or a young child, said method comprising administering to said infant or young child a nutritional composition comprising at least one fucosylated oligosaccharide and at least one N-acetylated oligosaccharide.

The different embodiments, details and examples previously described in the specification (e.g. related to the types and amounts of oligosaccharide, the nutritional composition, the administration, the targeted population . . . ) also apply to all these other objects.

EXAMPLES

The following examples illustrate some specific embodiments of the composition for use according to the present invention. The examples are given solely for the purpose of illustration and are not to be construed as limitations of the present invention, as many variations thereof are possible without departing from the spirit of the invention.

Example 1

An example of the composition of a nutritional composition (e.g. an infant formula) according to the present invention is given in the below table 1. This composition is given by way of illustration only.

TABLE 1 an example of the composition of a nutritional composition (e.g. an infant formula) according to the present invention

| Nutrients | per 100 kcal | per litre |
|---|---|---|
| Energy (kcal) | 100 | 670 |
| Protein (g) | 1.83 | 12.3 |
| Fat (g) | 5.3 | 35.7 |
| Linoleic acid (g) | 0.79 | 5.3 |
| α-Linolenic acid (mg) | 101 | 675 |
| Lactose (g) | 11.2 | 74.7 |
| Minerals (g) | 0.37 | 2.5 |
| Na (mg) | 23 | 150 |
| K (mg) | 89 | 590 |
| Cl (mg) | 64 | 430 |
| Ca (mg) | 62 | 410 |
| P (mg) | 31 | 210 |
| Mg (mg) | 7 | 50 |
| Mn (µg) | 8 | 50 |
| Se (µg) | 2 | 13 |
| Vitamin A (µg RE) | 105 | 700 |
| Vitamin D (µg) | 1.5 | 10 |
| Vitamin E (mg TE) | 0.8 | 5.4 |
| Vitamin K1 (µg) | 8 | 54 |
| Vitamin C (mg) | 10 | 67 |
| Vitamin B1 (mg) | 0.07 | 0.47 |
| Vitamin B2 (mg) | 0.15 | 1.0 |
| Niacin (mg) | 1 | 6.7 |
| Vitamin B6 (mg) | 0.075 | 0.50 |
| Folic acid (µg) | 9 | 60 |
| Pantothenic acid (mg) | 0.45 | 3 |
| Vitamin B12 (µg) | 0.3 | 2 |
| Biotin (µg) | 2.2 | 15 |
| Choline (mg) | 10 | 67 |

TABLE 1-continued an example of the composition of a nutritional composition (e.g. an infant formula) according to the present invention

| Nutrients | | per 100 kcal | per litre |
|---|---|---|---|
| Fe (mg) | | 1.2 | 8 |
| I (µg) | | 15 | 100 |
| Cu (mg) | | 0.06 | 0.4 |
| Zn (mg) | | 0.75 | 5 |
| Oligosaccharides | 2FL (g) | 0.15 | 1 |
| (HMOs) | LNnT (g) | 0.075 | 0.5 |

Example 2

Description of the Study 5 week old females BALB/cByJ CRL mice from Charles River were split intoseveral groups and fed during 6 weeks based on the following protocol:

Week 1: low-fiber diet (composition is detailed in table 2) for all groups

Weeks 2 to 6:
  Control group (group A): low-fiber diet (same as for week 1)
  Test groups (groups B-D): low-fiber diet (same as for week 1) supplemented with 5 wt % of a tested fiber (5% of the total low fiber diet was replaced by 5% of a tested fiber)

TABLE 2 composition of the low fiber diet

| Major Nutrients | |
|---|---|
| Dry matter | 93.9% |
| Crude protein | 18.0% |
| Crude fat | 5.0% |
| Crude fiber | 0.3% |
| Crude ash | 3.5% |
| Nitrogen-free extract (NFE) | 67.1% |
| Gross energy | 17.7 MJ/kg |
| Metabol. energy | 16.1 MJ/kg |
| Starch | 42.5% |
| Amino acids | |
| Arginine | 0.76% |
| Lysine | 1.66% |
| Methionine | 0.60% |
| Methionine + cystine | 0.97% |
| Tryptophan | 0.28% |
| Threonine | 0.92% |
| Major mineral elements | |
| Calcium | 0.62% |
| Phosphorus | 0.33% |
| Magnesium | 0.06% |
| Sodium | 0.24% |
| Potassium | 0.41% |
| Chlorine | 0.58% |
| Trace elements | |
| Iron | 50 mg/kg |
| Zinc | 37 mg/kg |
| Copper | 6 mg/kg |
| Iodine | 0.6 mg/kg |
| Manganese | 12 mg/kg |
| Selenium | 0.22 mg/kg |
| Vitamins added | |
| Vitamin A | 4'000 IE|UI|IU/kg |
| Vitamin D3 | 1'000 IE|UI|IU/kg |
| Vitamin E | 100 mg/kg |
| Vitamin K3 | 4 mg/kg |
| Vitamin B1 | 5 mg/kg |

TABLE 2-continued composition of the low fiber diet

| Vitamin B2 | 6 mg/kg |
|---|---|
| Vitamin B6 | 6 mg/kg |
| Vitamin B12 | 0.05 mg/kg |
| Nicotinic acid | 32 mg/kg |
| Pantothenic acid | 16 mg/kg |
| Folic acid | 2 mg/kg |
| Biotin | 0.2 mg/kg |
| Choline | 998 mg/kg |

The Following Fibers were Tested:
HMO=human milk oligosaccharides. 2FL+LNnT were tested in a weight ratio of 1:1
PDX=polydextrose
Pectin Table 3 provides a summary of the different tested groups and diets.

TABLE 3 tested groups and diets of the study

| Group | Group label | Diet | Sample size |
|---|---|---|---|
| A | Pos ctr or Ctrl pos | Low-fiber diet | 8 |
| B | HMO | Low-fiber diet + 5 wt % HMOs (=2FL + LNnT in a weight ratio of 1:1) | 8 |
| C | PDX | Low-fiber diet + 5 wt % polydextrose | 8 |
| D | Pectin | Low-fiber diet + 5 wt % pectin | 8 |

After 6 weeks, the animals of each group were sacrificed and the content from caecum was collected. The SCFA production were measured by Gas-Liquid Chromatography (GLC; amounts of SCFA in nmol/mg dry weight). The following SCFA were measured: propionate, butyrate, valerate and acetate.

The measure was made based on the following protocol: SCFA in an acid solution (pH 2.0 to 3.0) were separated on a GLC column coated with a polar stationary phase. This allowed for minimal preparation of the sample (no derivatisation) and straightforward basic FID detection. SCFA were extracted from caecum using an acid phosphate buffer containing HgCl2 for inactivation of any residual bacterial activity and an internal standard (2,2 Dimethyl-butyric acid) for GLC analysis. After centrifugation, the sterile-filtered supernatant was ready for analysis by GLC. SCFA were measured simultaneously.

Median ratio values were calculated in order to compare the different fiber-enriched diets on SCFA production.

Findings

Figure 1:
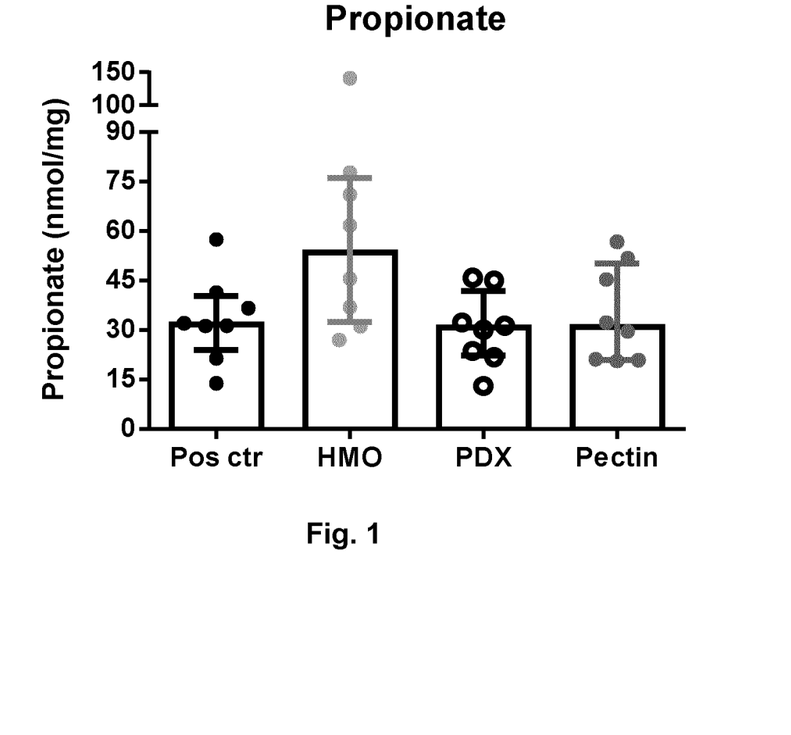
FIG. 1 represents the propionate production from caecum of mice fed with low-fiber diets and with low-fiber diets enriched with 5% of different tested fibers.

The production of propionate by HMO enriched diet was significantly increased (see FIG. 1). Its production was increased by around 69% in comparison to the positive control. Its production was increased by 73 and 75% in comparison to the pectin and PDX, respectively.

This is very surprising since pectin is usually seen as a high-inducer of SCFA (Stark et al, J Nutr. 1993, In vitro production of short-chain fatty acids by bacterial fermentation of dietary fiber compared with effects of those fibers on hepatic sterol synthesis in rats; Yang et al, Anaerobe, 2013, In vitro characterization of the impact of selected dietary fibers on fecal microbiota composition and short chain fatty acid production).

Figure 2:
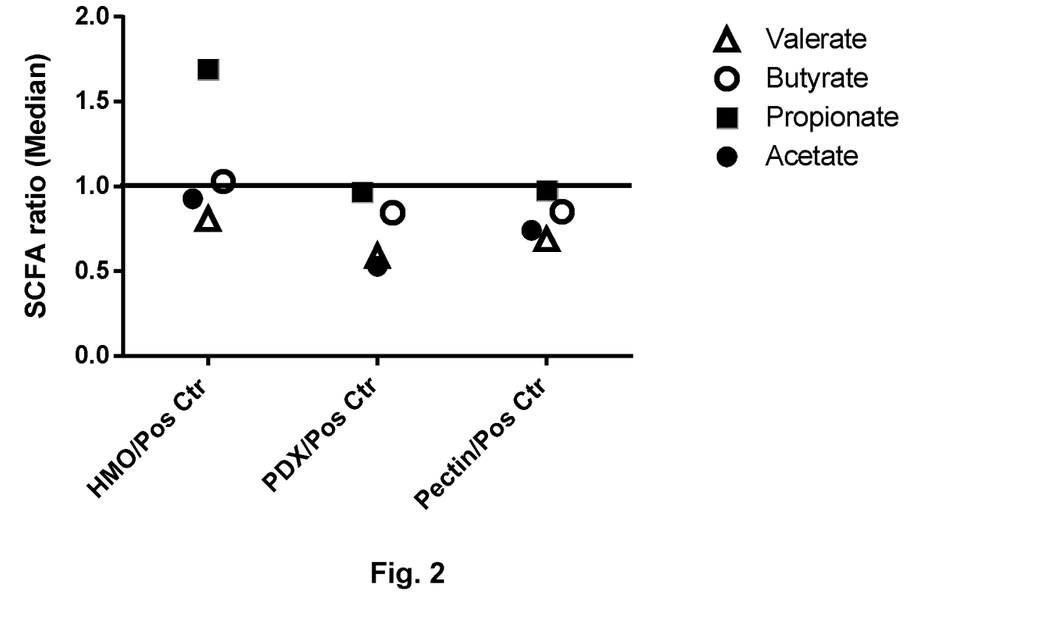
FIG. 2 represents the ratio of the median of each SCFA of fiber-enriched diet divided by the median of the positive control diet.

FIG. 2 represents the ratio of the median of each tested SCFA of each fiber-enriched diet divided by the median of the positive control diet (i.e. low-fiber diet only). A ratio of 1 (black line) means that there is no difference between the enriched diet and the control diet. A ratio below 1 means that the corresponding SCFA is higher in the control diet when compared to the fiber-enriched diet whereas a ratio above a means that the corresponding SCFA is higher with the fiber-enriched diet than the control.

The PDX and Pectin enriched diets induced less SCFA release of all kinds. On the contrary the HMO enriched diets induced more propionate and butyrate release than the low-fiber diet. The HMO-enriched diet was the only one to promote the propionate with a so large difference contrary to the other kinds of SCFA, and contrary to the other tested fibers.

The inventors therefore surprisingly found that mice fed with a composition comprising at least one fucosylated oligosaccharide and at least one N-acetylated oligosaccharide were having a significantly higher caecal (and therefore colonic) propionate production. Due to the known properties of propionate especially in the regulation of food intake and enhancement of satiety, a composition comprising at least one fucosylated oligosaccharide and at least one N-acetylated oligosaccharide would therefore be efficient in infants or young children for use in reducing and/or controlling food intake and/or in promoting a healthy growth.

Example 3

Description of the Study

A wide group of pregnant female rats were bought from Charles River laboratories. Some of them were submitted to food restriction of 60% during the last 10 days of gestation.

Immediately after birth (d=1), the born rat pups—subjects of the experiment—were split intoseveral groups:
  Normal rats (reference): no IUGR (Intrauterine growth restriction) during their mothers' pregnancy (n=20).
  IUGR rats (control): IUGR during their mothers' pregnancy, i.e. food restriction of 60% for the pregnant mothers during the last 10 days of gestation (n=20)
  IUGR rats+HMO (test groups): 3 different groups:
    IUGR rats+2FL (n=20)
    IUGR rats+LNnT (n=20)
    IUGR rats+2FL/LNnT (also called IUGR rats+HMOs mix) (n=20)
    IUGR during their mothers' pregnancy, i.e. food restriction of 60% for the pregnant rats mothers during the last 10 days of gestation.
    During the experiment, they will be fed with milk then a standard diet supplemented with HMO: 2FL; LNnT or 2FL+LNnT (in a weight ratio 2:1), see details below.
  Normal rats were chosen as reference model. IUGR (intrauterine growth restricted) rats were chosen as control model since they will have a higher appetite to compensate their growth retardation, and therefore they may not eat in a healthy way with standard diets (e.g. they may have a higher total weight and/or adipose mass increase over their lean mass increase) which may lead to the development and programming for future health conditions including later in life obesity or future related comorbidities.

All rat pups were fed from birth (d=1) up to 57 days (d=57) based on the following protocol:
  day 1-day 6: all groups of rats were nursed by dam (mothers' milk only)
  day 7-day 21: all rats were nursed by dam (mothers' milk only). But in the test groups, 3 g/kg body weight of a HMO or a HMOs mix were also administered by gavage:
    2FL: 3 g/kg body weight, for the group IUGR rats+2FL
    LNnT: 3 g/kg body weight, for the group IUGR rats+LNnT
    2FL: 2 g/kg body weight+LNnT: 1 g/kg body weight, for the group IUGR rats+2FL/LNnT
  day 22-day 57: rats were separated from their mothers and they had the following regimen:
    Normal rats and IUGR rats: fed with a control diet (composition detailed in table 4), no HMO supplementation
    Test groups: fed with the same diet but supplemented with 4.5 wt % of a HMO or HMOs mix (maltodextrin in the total control diet was replaced by the respective HMO(s)):
    4.5 wt % of 2FL for the group IUGR rats+2FL
    4.5 wt % of LNnT for the group IUGR rats+LNnT
    3 wt % of 2FL+1.5 wt % of LNnT for the group IUGR rats+2FL/LNnT

TABLE 4 composition of the control diet

|  | % |
|---|---|
| Cornstarch | 53.4 |
| Casein | 20 |
| Sucrose | 10 |
| Soybean oil | 7 |
| Mineral Mix AIN-93-G * | 3.5 |
| Choline bitartrate | 0.25 |
| L-Cystine | 0.3 |
| Tert-butylhydroquinone | 0.0014 |
| Vitamin Mix AIN-93-VX * | 1 |
| Maltodextrin | 4.5 |

* from Research Diets, Inc

To assess the efficiency of the feeding of these rats, especially tosee whether the feeding imply a healthy growth or not, several parameters were calculated, including:
  the lean mass: it corresponds to the amount of weight in the body composition that is not fat. It was measured by magnetic resonance imaging.
  the relative intake: it corresponds to the total food intake divided by the average body weight of a specified period. It was assessed for several periods during the entire experiment (so the total of food ingested was measured in continuous during several days to make the calculation).

Significance was assessed using the Wilcoxon two-tails t-test analysis for type II error.

Findings

Figure 3:
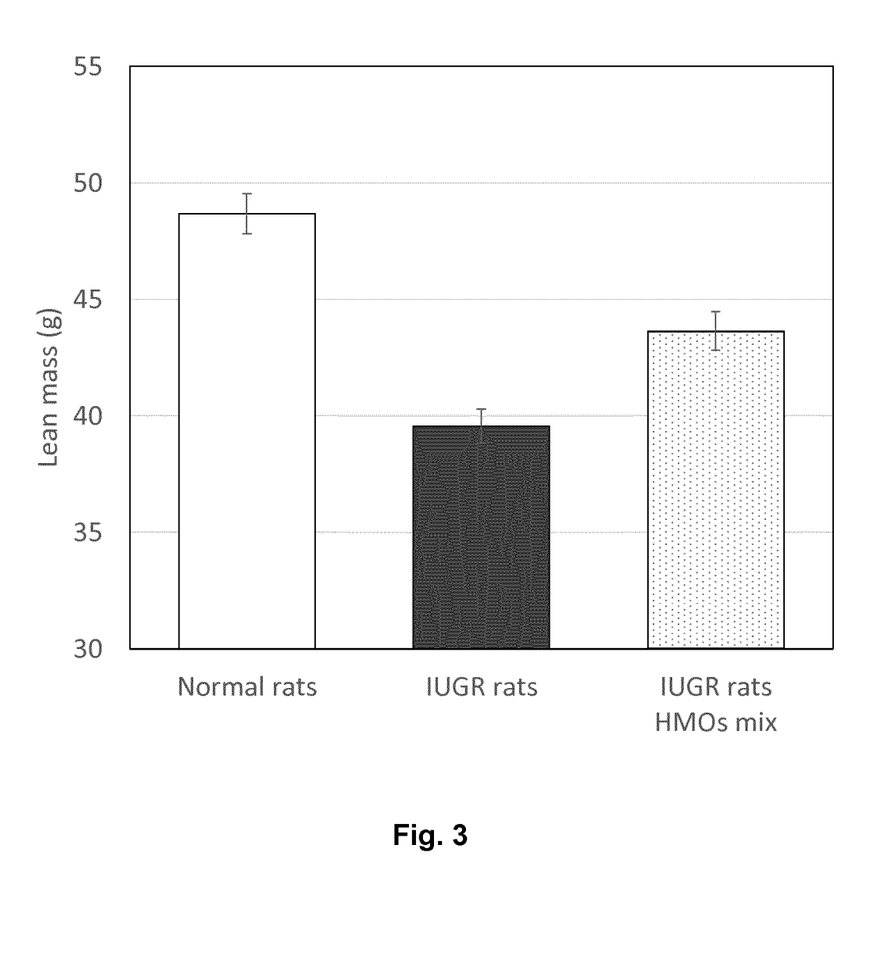

While the lean mass of the IUGR rats was significantly lower than the normal rats, the inventors have surprisingly seen that at day 22 (so around 3 weeks of age) the lean mass of the IUGR rats+HMOs mix was significantly increased and comes closer to the reference group (normal rats). This is illustrated in FIG. 3.

Figure 4A:
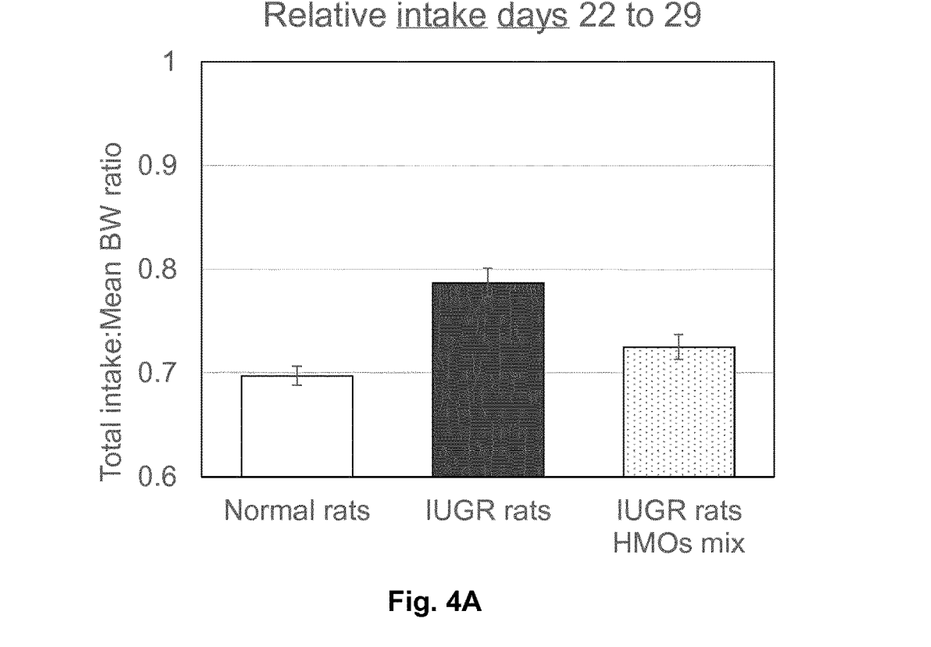
Figure 4B:
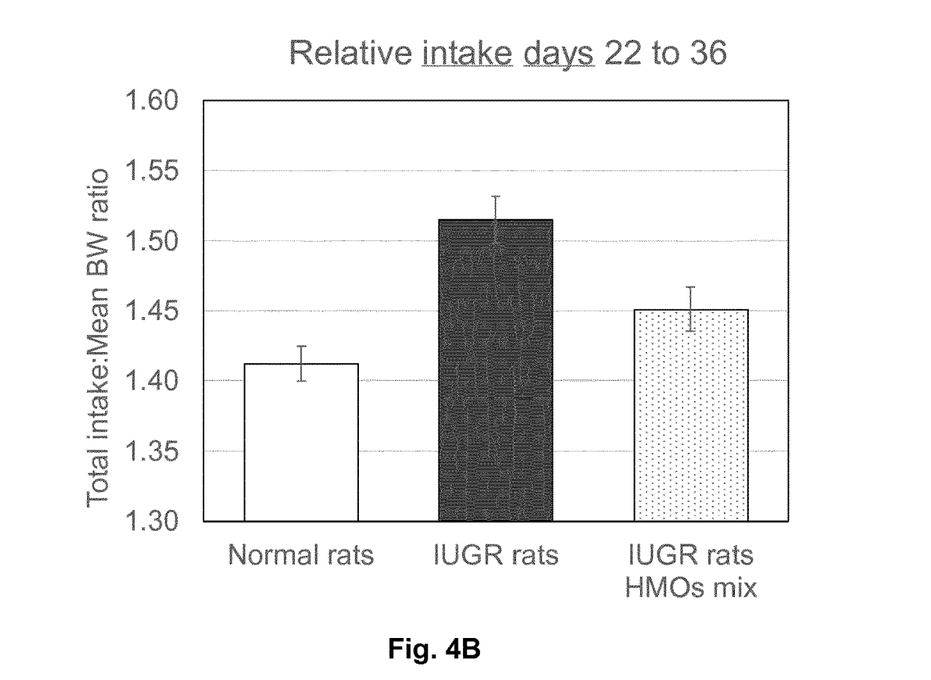

As shown in FIG. 4A (period day 22-day 29) and 4B (period day 22-day 36), the relative intake of the IUGR rats was significantly higher than the relative intake of the normal rats. These rats had a higher appetite and ate more food. However, when administering the HMO mix, the rats' appetite was regulated (decreased): the relative intake of the IUGR rats+HMOs mix (2FL+LNnT) was significantly reduced in comparison to the IUGR rats, and it comes closer to the reference group (normal rats), see FIGS. 4 and 5.

Figure 5A:
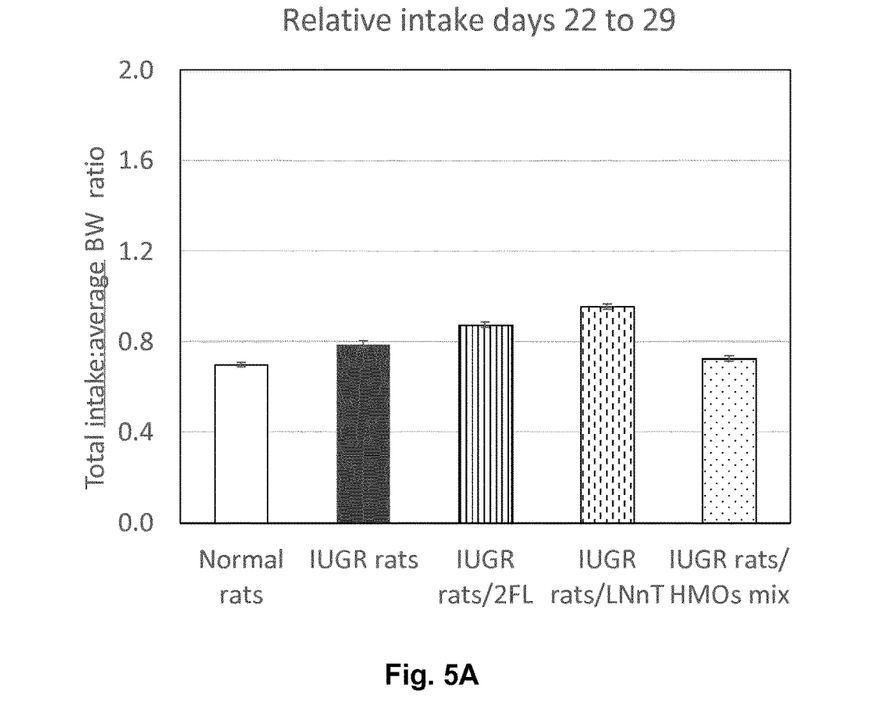
Figure 5B:
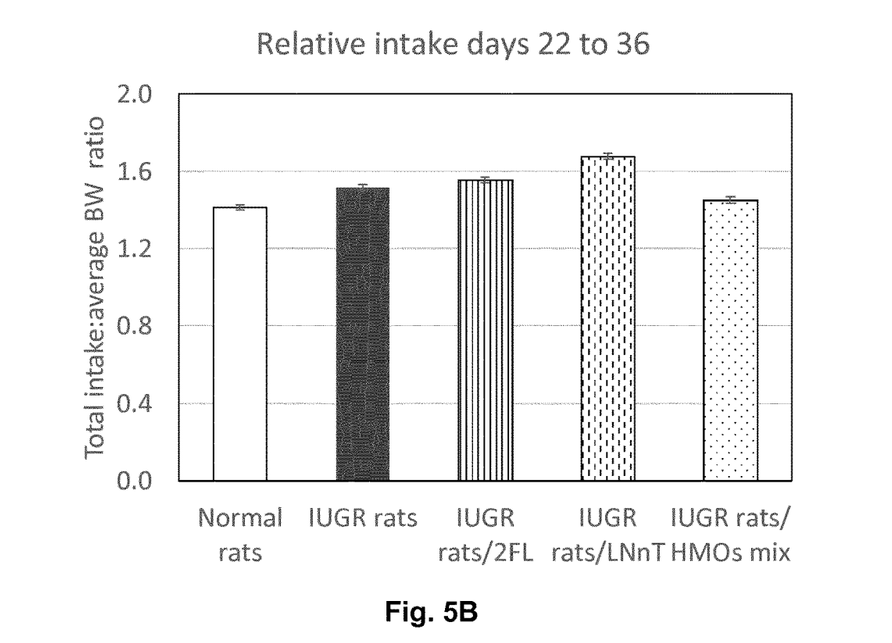

Even more surprisingly, there seems to be a real synergy between 2FL and LNnT of the HMOs mix since the relative intake of the IUGR rats supplemented with a single HMO (2FL alone or LNnT alone) was not decreased but even significantly increased in comparison to the relative intake of the IUGR rats (control, no HMO), as illustrated in FIG. 5A (period day 22-day 29) and 5B (period day 22-day 36). The same tendencies were observed with the HMOs mix (2FL+LNnT) for the other periods during the entire experimentation.

The inventors therefore surprisingly found that rats in needs/at risk (IUGR rats, i.e. rats with a higher appetite and therefore prone to develop future health conditions) fed with a composition comprising at least one fucosylated oligosaccharide and at least one N-acetylated oligosaccharide had a higher lean mass, a regulated appetite and a significantly reduced relative intake in comparison to the IUGR rats, and that tend to get closer to the reference group.

A composition according to the invention would therefore be efficient in infants or young children for use in reducing and/or controlling food intake and/or in promoting a healthy growth.

Example 4

During the same experience performed in example 3, another parameter (growth) was also measured. To shortly recap, Intra-uterine growth retarded (born from dams receiving only 40% of ad libitum intake recorded for Reference pregnant dams) and Reference (born from Reference dams) pups were gavaged with 3 g/kg of body weight of either 2FL, LNnT, HMOs mix (2FL:LNnT; 2:1 ratio) or Maltodextrine (IUGR & Reference) during the suckling period (p7 to p21). At weaning (p21), rats were offered ad libitum access to semi-purified diets supplemented with the corresponding treatment (4.5% weight/weight) until day p57. All rats were fed ad libitum quantities of the same chow diet from p57 to the end of the experiment on p157.

Figure 6:
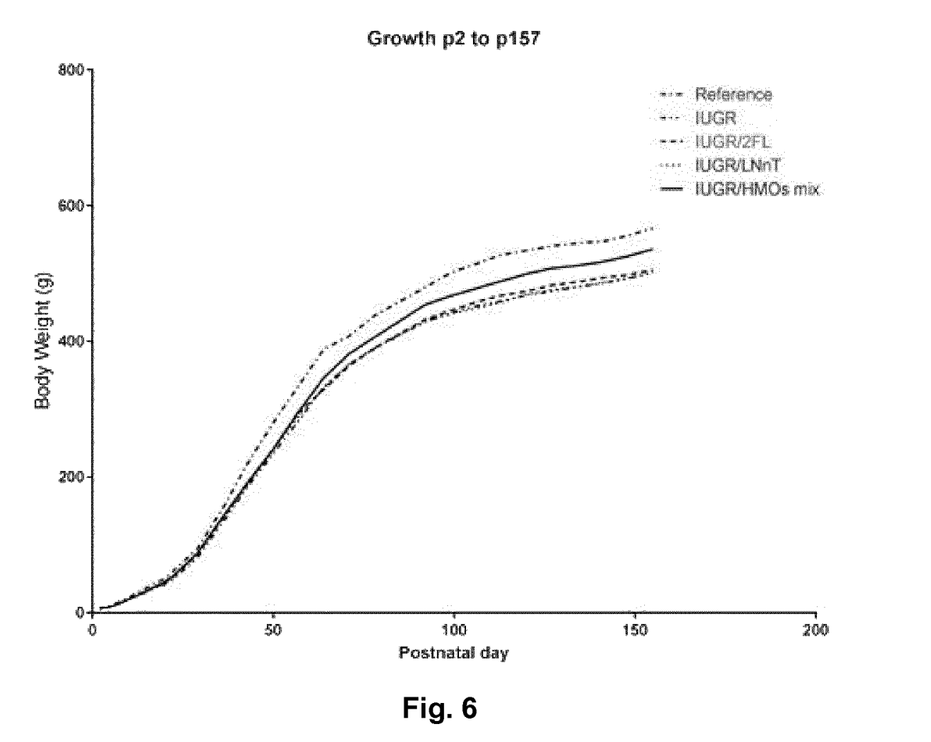
FIG. 6 represents the growth of IUGR pups fed with different diets (2FL, LNnT, 2FL+LNnT or maltodextrin (reference/control)) from p2 to p157.

As illustrated in FIG. 6, HMOs mix (2FL+LNnT) increased growth of IUGR pups over those supplemented with 2FL, LNnT or control IUGR pups.

Example 5

Figure 7:
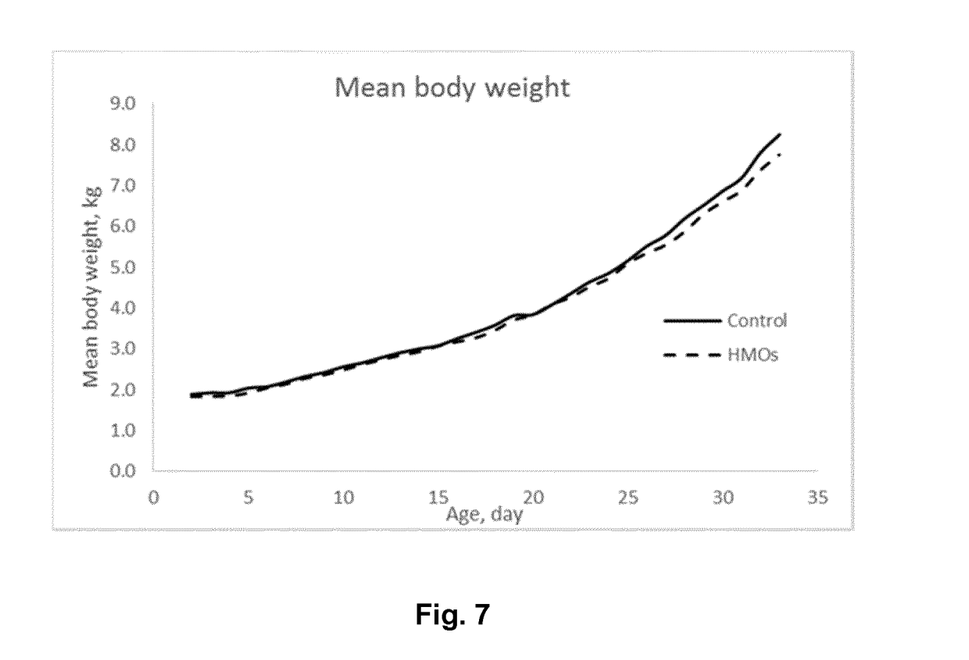
FIG. 7 represents the mean body weight of piglets fed with milk replacer supplemented with 1.5 g/L of HMOs (1 g of 2FL+0.5 g of LNnT) or with a control milk replacer, from p2 to p32.
Figure 8:
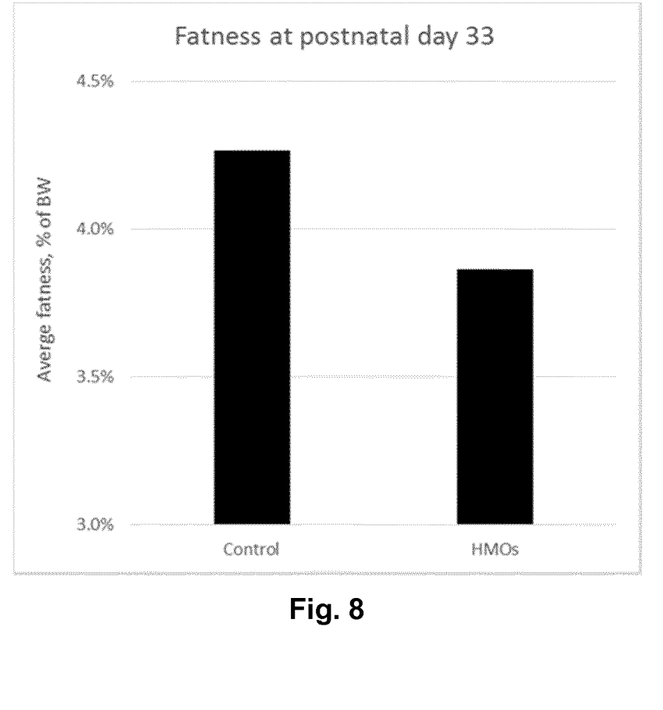
FIG. 8 represents the fatness at p33 of piglets fed with milk replacer supplemented with 1.5 g/L of HMOs (1 g of 2FL+0.5 g of LNnT) or with a control milk replacer.

Two-day old piglets were randomly assigned to receive fixed amounts (285 or 325 ml/kg of body weight from p2 to p5 and from p6 to p33, respectively) of milk replacer supplemented with 1.5 g/L of HMOs (1 g of 2FL+0.5 g of LNnT) or control milk replacer until the end of the study on day p32. Body weight was measured daily and is depicted in FIG. 7. At the end of the study, viscera were removed and soft tissue was collected from carcass after removing skin, feet and bones. Soft tissue was analyzed chemically for protein and lipid content. Lipid content is expressed as % of total body weight in FIG. 8.

Piglets supplemented with 2FL and LNnT mix had similar body weight and weight gain than control animals. However, this piglets had a lower % fat content at the end of the experimental period on day 33 of age.

A nutritional composition comprising at least one fucosylated oligosaccharide and at least one N-acetylated oligosaccharide would therefore be efficient in infants or young children for use to avoid excessive fat mass accumulation or prevent related later in life health disorders like later in life obesity.

The invention claimed is:

1. A method for reducing and/or controlling food intake in an infant or a young child in need thereof, the method comprising the step of administering to the infant or young child a nutritional composition comprising a fucosylated oligosaccharide and an N-acetylated oligosaccharide, wherein the fucosylated oligosaccharide and the N-acetylated oligosaccharide are present in a total amount of from 0.1 to 10 wt % of the nutritional composition.

2. The method according to claim 1, wherein the fucosylated oligosaccharide is selected from the group consisting of 2'-fucosyllactose, 3'fucosyllactose, difucosyllactose, lacto-N-fucopentaose I, lacto-N-fucopentaose II, lacto-N-fucopentaose III, lacto-N-fucopentaose V, lacto-N-fucohexaose, lacto-N-difucohexaose I, fucosyllacto-N-hexaose, fucosyllacto-N-neohexaose I, fucosyllacto-N-neohexaose II, difucosyllacto-N-hexaose I, difucosyllacto-N-neohexaose I, difucosyllacto-N-neohexaose II, fucosyl-para-Lacto-N-hexaose, fucosylated oligosaccharide comprising a 2' fucosyl-epitope, 2'-fucosyllactose (2'FL), and any combination thereof.

3. The method according to claim 1, wherein the N-acetylated oligosaccharide is selected from the group consisting of lacto-N-tetraose (LNT), lacto-N-neotetraose (LNnT), para-lacto-N-neohexaose (para-LNnH), and any combination thereof.

4. The method according to claim 1, wherein the nutritional composition comprises (i) 2'-fucosyllactose (2'FL) and lacto-N-neotetraose (LNnT) or (ii) an oligosaccharide mixture consisting of 2'-fucosyllactose (2'FL) and lacto-N-neotetraose (LNnT).

5. The method according to claim 1, wherein the fucosylated oligosaccharide:N-acetylated oligosaccharide weight ratio is from 1:10 to 12:1.

6. The method according to claim 1, wherein the nutritional composition further comprises an additional oligosaccharide and/or a fiber and/or a precursor of a human milk oligosaccharide selected from the group consisting of galacto-oligosaccharides (GOS), fructo-oligosaccharides (FOS), xylooligosaccharides (XOS), inulin, polydextrose, sialylated oligosaccharides, sialic acid, fucose and any combination thereof.

7. The method according to claim 1, wherein the nutritional composition is in a form selected from the group consisting of an infant formula, a starter infant formula, a follow-on or follow-up infant formula, a baby food, an infant cereal composition, a fortifier and a supplement.

8. The method according to claim 1, wherein the infant or young child has difficulties with controlling their food intake or has an abnormal food intake.

9. The method of claim 1, wherein the infant or young child has at least one characteristic selected from the group consisting of (i) eating more than other infants or young children of the same age and of the same size, (ii) having an altered perception of satiety, and (iii) having an excessive weight gain during the first few months of life.

10. A method for promoting a healthy growth in an infant or a young child in need thereof, the method comprising administering to the infant or young child a nutritional composition comprising a fucosylated oligosaccharide and an N-acetylated oligosaccharide, wherein the fucosylated oligosaccharide and the N-acetylated oligosaccharide are present in a total amount of from 0.1 to 10 wt % of the nutritional composition, wherein the infant or young child has difficulties with controlling their food intake or has an abnormal food intake, or wherein the infant or young child has at least one characteristic selected from the group consisting of (i) eating more than other infants or young children of the same age and of the same size and (ii) having an altered perception of satiety.

11. The method according to claim 10, wherein the fucosylated oligosaccharide is selected from the group list consisting of 2'-fucosyllactose, 3' fucosyllactose, difucosyllactose, lacto-N-fucopentaose I, lacto-N-fucopentaose II, lacto-N-fucopentaose III, lacto-N-fucopentaose V, lacto-N-fucohexaose, lacto-N-difucohexaose I, fucosyllacto-N-hexaose, fucosyllacto-N-neohexaose I, fucosyllacto-N-neohexaose II, difucosyllacto-N-hexaose I, difucosyllacto-N-neohexaose I, difucosyllacto-N-neohexaose II, fucosyl-para-Lacto-N-hexaose, fucosylated oligosaccharide comprising a 2' fucosyl-epitope, 2'-fucosyllactose (2'FL), and any combination thereof.

12. The method according to claim 10, wherein the nutritional composition comprises (i) 2'-fucosyllactose (2'FL) and lacto-N-neotetraose (LNnT) or (ii) an oligosaccharide mixture consisting of 2'-fucosyllactose (2'FL) and lacto-N-neotetraose (LNnT).

13. The method according to claim 10, wherein the fucosylated oligosaccharide:N-acetylated oligosaccharide weight ratio is from 1:10 to 12:1.

14. The method according to claim 10, wherein the nutritional composition further comprises an additional oligosaccharide and/or a fiber and/or a precursor of a human milk oligosaccharide selected from the group consisting of galacto-oligosaccharides (GOS), fructo-oligosaccharides (FOS), xylooligosaccharides (XOS), inulin, polydextrose, sialylated oligosaccharides, sialic acid, fucose and any combination thereof.

15. The method according to claim 10, wherein the nutritional composition is in a form selected from the group consisting of an infant formula, a starter infant formula, a follow-on or follow-up infant formula, a baby food, an infant cereal composition, a fortifier and a supplement.

* * * * *